United States Patent
Greene

[15] 3,642,532
[45] Feb. 15, 1972

[54] VULCANIZING RUBBER COVERED WIRE

[72] Inventor: Charles W. Greene, Spartanburg, S.C.

[73] Assignee: Deering Milliken Research Corporation, Spartanburg, S.C.

[22] Filed: June 15, 1970

[21] Appl. No.: 46,415

[52] U.S. Cl. ............................................117/233, 260/811
[51] Int. Cl. ...................................B44d 1/34, C08c 17/06
[58] Field of Search ...........................260/811, 775; 117/233

[56] References Cited

UNITED STATES PATENTS

| 2,261,847 | 11/1941 | Dufour et al. | 117/233 |
| 2,427,196 | 9/1947 | Cox | 117/233 X |
| 3,187,071 | 6/1965 | Radziejowski | 117/233 X |

Primary Examiner—Leonard H. Gerin
Attorney—Norman C. Armitage and H. William Petry

[57] ABSTRACT

A method which comprises applying unvulcanized rubber to a continuous metal wire cord and subjecting the coated cord to high-frequency induction heating as the cord is advanced from a cord supply source to a collection station; the heating step vulcanizing the rubber coating to a high degree adjacent the cord and a low degree at the outer surface of the coating.

5 Claims, 2 Drawing Figures

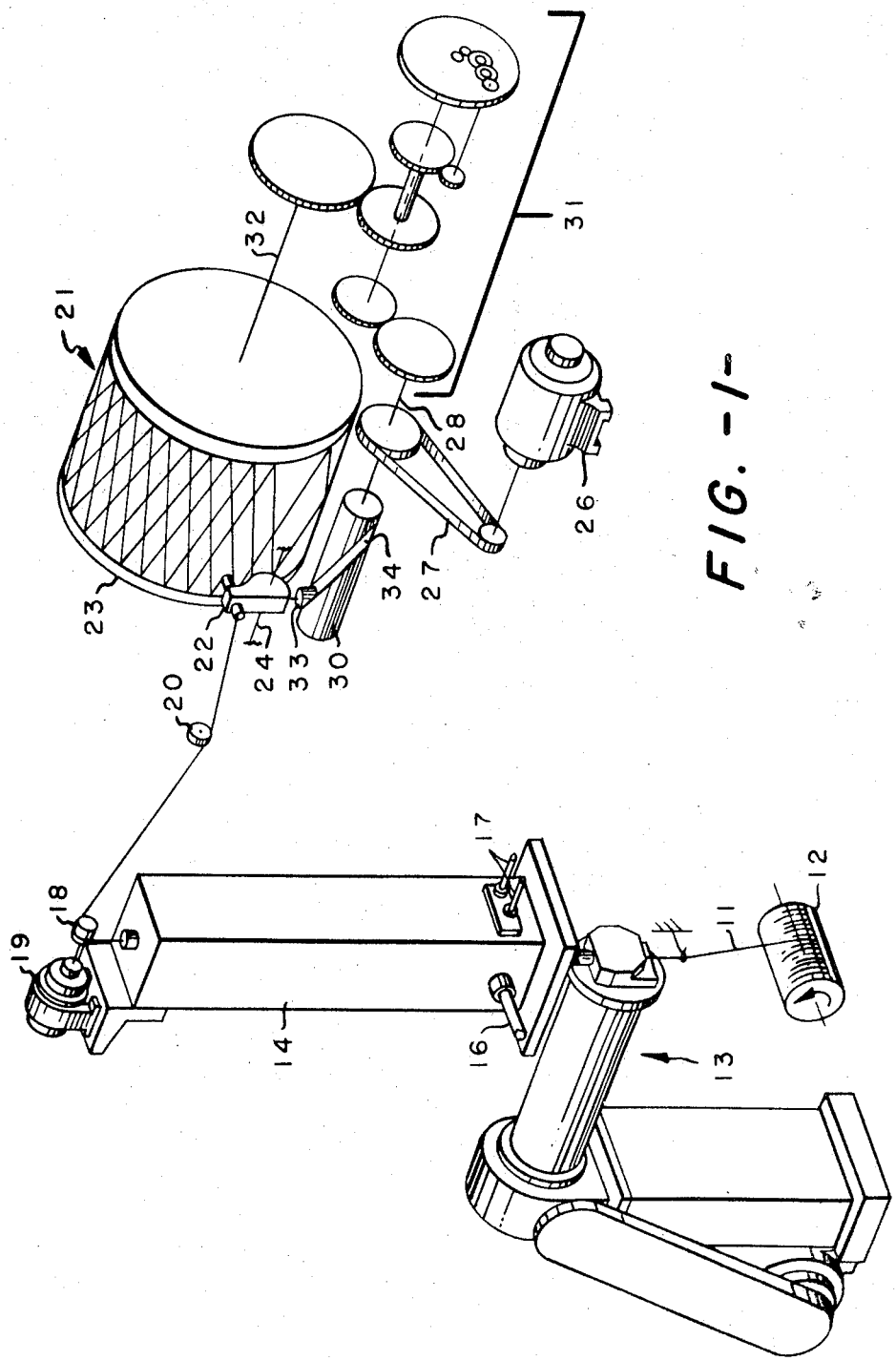

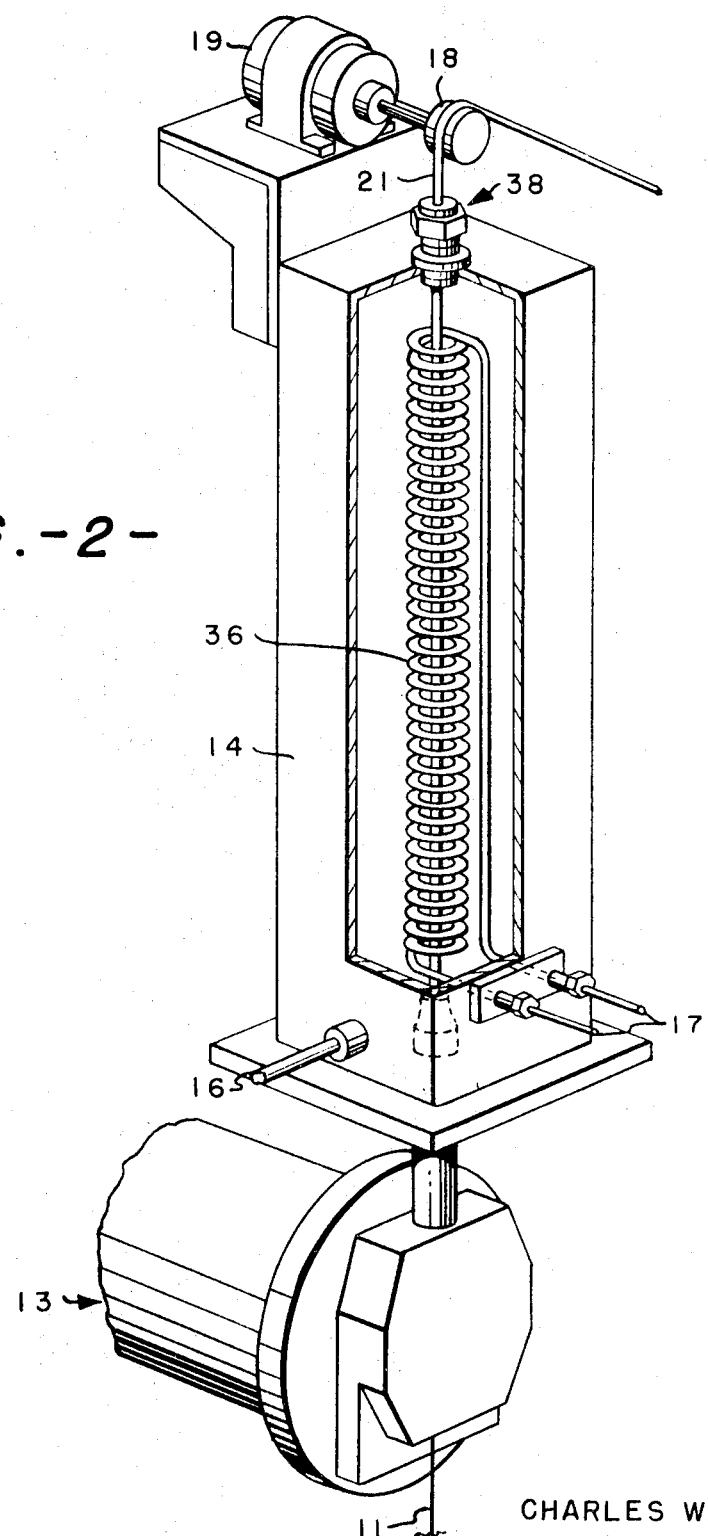

VULCANIZING RUBBER COVERED WIRE

This invention relates to the vulcanization of rubber coatings on wire and more particularly relates to the vulcanization of such rubber coatings while retaining the tackiness of the outer surface.

The tire industry recently has developed considerable interest in tire constructions which include an annular reinforcement belt or breaker strip about the periphery of the tire between the tread and the carcass. Such belted tires have the advantage of better road stability and longer tread life both in radial and bias ply constructions.

It has been proposed to form tire reinforcement belts by winding one or more continuous length of cord onto a rotating drum while employing a reciprocating guide to traverse the drum surface and to lay the cord in a generally zigzag pattern thereon. Examples of such belts are disclosed in U.S. Pat. Nos. 2,982,327 and 3,422,874. Prior to the displacement of the cord on the drum surface, the cord may be coated with unvulcanized rubber. This coating which is quite tacky facilitates adhesion of the cord to the drum, adhesion between adjacent cord and also between the cord and the tread and carcass portions of the tire.

When wire cord is used in the formation of tire belts, a number of problems are encountered which are not present when other cord materials are employed. The stiffness of the wire increases the possibility of adjacent cords cutting through the intermediate rubber coating so that the wire cords contact each other and cause damage or breakage resulting in premature failure of the tire. This is a problem particularly at the points in the belt where the wires cross each other.

The present invention provides a novel method of forming a rubber coating on continuous metal wire cord, the rubber having a high degree of vulcanization adjacent the cord and a low degree of vulcanization at the outer surface of the coating. The invention also provides a novel endless reinforcement or belt formed with such coated cord.

The method of the present invention comprises applying unvulcanized rubber to continuous metal wire cord and subjecting the coated cord to high-frequency induction heating as the cord is advanced from a cord supply source to a collection station. The endless reinforcement or belt of the invention comprises continuous metal wire cord having a rubber coating thereon with a high degree of vulcanization adjacent the cord interface and a low degree of vulcanization at the outer surface of the coating.

Preferably, the induction heating of the rubber coated wire cord is accomplished at a super atmospheric pressure to minimize the possibility of vaporization adjacent the interface of the rubber and the wire. The super atmospheric pressure employed is desirably between about 20 and 400 pounds per square inch gauge pressure.

The high-frequency heating may be accomplished using known sources of high-frequency energy. The heating of the moving coated cord under a super atmospheric pressure requires that the heating be done in a chamber with a suitable seal arrangement to maintain the pressure level in the chamber without excessive fluid flow rates while at the same time facilitating passage of the coated cord without damage.

The invention will be illustrated further with reference to the accompanying drawings in which:

FIG. 1 is a schematic view in perspective of one form of apparatus of the invention, and FIG. 2 is an enlarged fragmentary view partially in section of part of the apparatus shown in FIG. 1.

As shown in FIG. 1, an extruder 13 has associated therewith a pressure chamber 14 having a fluid inlet 16 for a pressure fluid such as compressed air and connections 17. A pulley 18 which is driven by motor 19 is disposed at the outlet of chamber 14. A winding apparatus 21 for forming an endless reinforcement includes a rotatable winding drum 23 and a guide 22 which is mounted for movement on rod 24. Drum 23 and the cord guide 22 are driven by a power source shown as motor 26. Motor 26 is drivingly connected through a belt and pulley arrangement 27 to a rotatable shaft 28. One end of shaft 28 is associated with barrel cam 30 and the opposite end through a suitable gear train 31 to shaft 32 for drum 23. A cam follower 33 connected to the cord guide 22 engages a groove 34 in the surface of cam 30. Groove 34 is of such a configuration that during rotation of the winding drum 23, cord guide 22 reciprocates across drum surface transversely to the direction of rotation. As shown in greater detail in FIG. 2 pressure chamber 14 has an induction heating coil 36 disposed therein and an outlet 38.

In the operation of the apparatus illustrated in the drawings, metal wire cord 11 from a supply package 12 is drawn through extruder 13 and pressure chamber 14 by pulley 18 driven by motor 19. Within the chamber, the cord moves through induction heating coil 36. The coated cord then passes over guide roller 20 to transversing guide 22 which positions the cord on rotating drum 23. Since the guide 22 reciprocates on rod 24 transversely of the rotation of the drum, the cord is laid in a zigzag pattern over the surface of the drum. Gear train 31 includes a combination of gears to control the position of the cord on the drum during each rotation of the drum so that the cord is laid on the surface in a predetermined position with respect to previously positioned cord lengths. The winding operation is continued until a complete reinforcement is produced, that is, the cord spacing and configuration is substantially uniform through out and is in accordance with the preselected pattern.

The above description and drawings show that the present invention provides a novel method for providing a rubber coating on continuous metal wire cord, which coating has a high degree of vulcanization adjacent the wire surface and a low degree of vulcanization at the outer surface of the cord. Furthermore, the present invention provides novel apparatus for producing such coated cord and endless reinforcements therefrom. Moreover, the invention provides novel apparatus for vulcanizing a running rubber coated metal wire cord.

It will be apparent that various modifications and variations may be made in the method and apparatus described in detail and shown in the drawings within the scope of the invention, For example, the heating chamber may be of a different design. Also, the means for transferring the cord from the heater and positioning it on the drum surface may employ other structural elements. In addition, the cord may be subjected to a multiplicity of passes through the pressure chamber using one or more heating coils. Therefore, the invention is to be limited only by the following claims.

That which is claimed is:

1. A method which comprises applying unvulcanized rubber to a continuous metal wire cord and subjecting the coated cord to high frequency induction heating as the cord is advanced from a cord supply source to a collection station; said heating step vulcanizing said rubber coating to a high degree adjacent the cord and a low degree at the outer surface of the coating.

2. A method according to claim 1 wherein the induction heating is performed at a super atmospheric pressure.

3. A METHOD according to claim 2 wherein the pressure is between about 20 and 400 p.s.i. gauge.

4. A method according to claim 1 wherein the cord after the heating step is wound on a drum surface in a zigzag pattern to form an endless reinforcement.

5. A method according to claim 1 wherein the unvulcanized rubber is applied to the cord by passing the cord through an extruder.

* * * * *